United States Patent
Zhao

(10) Patent No.: US 12,418,852 B2
(45) Date of Patent: Sep. 16, 2025

(54) CONFIGURATION INFORMATION DETERMINATION METHOD AND APPARATUS, AND COMPUTER-READABLE STORAGE MEDIUM

(71) Applicant: Beijing Xiaomi Mobile Software Co., Ltd., Beijing (CN)

(72) Inventor: Qun Zhao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 513 days.

(21) Appl. No.: 17/800,051

(22) PCT Filed: Feb. 17, 2020

(86) PCT No.: PCT/CN2020/075591
§ 371 (c)(1),
(2) Date: Aug. 16, 2022

(87) PCT Pub. No.: WO2021/163857
PCT Pub. Date: Aug. 26, 2021

(65) Prior Publication Data
US 2023/0093182 A1 Mar. 23, 2023

(51) Int. Cl.
*H04L 12/00* (2006.01)
*H04L 5/00* (2006.01)
(Continued)

(52) U.S. Cl.
CPC ........... *H04W 48/12* (2013.01); *H04L 5/0053* (2013.01); *H04W 72/23* (2023.01)

(58) Field of Classification Search
CPC ..... H04W 48/12; H04W 72/23; H04W 24/02; H04W 72/0453; H04L 5/0053; H04L 5/0094; Y02D 30/70
(Continued)

(56) References Cited

U.S. PATENT DOCUMENTS 6,377,987 B1 * 4/2002 Kracht .................... H04L 41/22
370/254
8,442,445 B2 * 5/2013 Mody .................... H04W 12/79
455/67.11
(Continued)

FOREIGN PATENT DOCUMENTS

CN 110602731 A * 12/2019 ............. H04L 5/005
EP 3598806 A1 1/2020

OTHER PUBLICATIONS

Office Action for India Application No. 202247052564, dated Aug. 19, 2024, 3 pages.
(Continued)

*Primary Examiner* — Frantz Coby
(74) *Attorney, Agent, or Firm* — Finnegan, Henderson, Farabow, Garrett & Dunner, L.L.P.

(57) ABSTRACT

A method for determining configuration information, includes: a first terminal receiving a master information block (MIB) and; the first terminal determining configuration information of a first control resource set based on the MIB, the configuration information of the first control resource set including a frequency domain width of the first control resource set, the frequency domain width of the first control resource set being less than a frequency domain width of a second control resource set of a second terminal, and the frequency domain width of the second control resource set being determined based on the MIB.

15 Claims, 6 Drawing Sheets

---

801 — the first terminal receiving a SSB, and the SSB includes a MIB

801 — the first terminal determining the CORESET corresponding to a value of the configuration field as configuration information of the first CORESET based on a first mapping relationship

(51) Int. Cl.
  *H04W 48/12* (2009.01)
  *H04W 72/23* (2023.01)
(58) Field of Classification Search
  USPC .......................................................... 370/330
  See application file for complete search history.

(56) References Cited

U.S. PATENT DOCUMENTS

2003/0208609 A1* 11/2003 Brusca ................ H04L 41/0806
                                                            709/230
2018/0206247 A1   7/2018 Sun et al.
2019/0394751 A1  12/2019 Park et al.
2022/0407655 A1* 12/2022 Liu ....................... H04L 5/0091

OTHER PUBLICATIONS

Examination Report of Indian Application No. 202247052564, issued on Nov. 29, 2022.
International Search Report and Written Opinion of International Application No. PCT/CN2020/075591, Nov. 20, 2020, 9 pages.
European Patent Office, Extended European Search Report issued in Application No. 20919538.7, dated Oct. 9, 2023, 10 pages.

* cited by examiner

CONFIGURATION INFORMATION DETERMINATION METHOD AND APPARATUS, AND COMPUTER-READABLE STORAGE MEDIUM

CROSS-REFERENCE TO RELATED APPLICATION

This application is the US national phase application of International Application No. PCT/CN2020/075591, filed on Feb. 17, 2020, the entire contents of which are incorporated herein by reference.

TECHNICAL FIELD

The disclosure relates to the communication technology field, and in particular to a method for determining configuration information, an apparatus for determining configuration information, and a computer-readable storage medium.

BACKGROUND

The continuous development of a new generation of new Internet applications has bright up higher requirements for wireless communication technology, which drives the continuous evolution of the wireless communication technology to meet needs of the applications. The fifth-generation (5G) cellular mobile communication system is committed to meet the requirements for different scenarios such as enhanced Mobile Broadband (eMBB), massive Machine-Type Communications (mMTC) and Ultra-Reliable and Low Latency Communication (URLLC). Meanwhile, some new services have also appeared, such as Time Sensitive Communication (TSC). For these new services, the requirements for throughput, time delay and reliability are lower than that of eMBB and URLLC but much higher than that of mMTC. However, for these new services, the restrictions on equipment cost, volume and power consumption are relatively lower than that of mMTC but greatly exceed that of eMBB and URLLC. That is, terminals with different capabilities may exist in the same communication system, and it is difficult for terminals with poor capabilities to access the communication system.

SUMMARY

According to a first aspect of the disclosure, a method for determining configuration information is provided. The method includes:
  receiving, by a first terminal, a master information block (MIB); and
  determining, by the first terminal, configuration information of a first control resource set (CORESET) based on the MIB, in which the configuration information of the first CORESET includes a frequency domain width of the first CORESET, the frequency domain width of the first CORESET is less than a frequency domain width of a second CORESET of a second terminal, and the frequency domain width of the second CORESET is determined based on the MIB.

According to a second aspect of the disclosure, a method for determining configuration information is provided. The method includes:
  determining a first signaling, in which the first signaling includes at least a first configuration field indicating configuration information of a first CORESET of a first terminal and a second configuration field indicating configuration information of a second CORESET of a second terminal, and a frequency domain width of the first CORESET is less than a frequency domain width of the second CORESET of the second terminal; and
  sending the first signaling to the first terminal.

According to a third aspect of the disclosure, an apparatus for determining configuration information is provided. The apparatus includes: a processor and a memory configured to store instructions executable by the processor. The processor is configured to implement the method for determining configuration information according to the first aspect of the disclosure or the method for determining configuration information according to the third aspect of the disclosure.

It should be understood that the above general description and the following detailed description are only exemplary and explanatory, and cannot limit the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

It should be understood that "a plurality of" refers to two or more. The term "and/or" describes an association relationship among the associated objects, indicating that there are three types of relationships, for example, A and/or B, i.e., A alone exists, A and B exist at the same time, and B exists alone. The character "/" generally indicates that the associated objects before and after are in an "or" relationship. The terms "first", "second" and similar terms used in the description and claims of the disclosure do not denote any order, quantity or importance, but are only used to distinguish different components.

Figure 1:
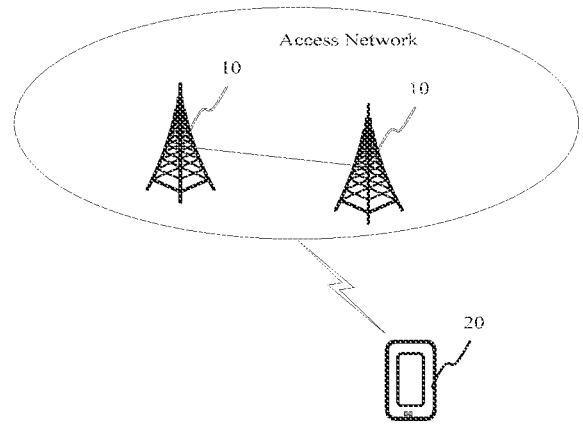
FIG. 1 is a schematic diagram of a communication system according to an embodiment.

FIG. 1 is a schematic diagram of a mobile communication system according to an embodiment. The mobile communication system includes: access network devices 10 and terminals 20.

The access network device 10 is deployed in a wireless access network to provide the terminal 20 with a wireless access function. The access network device may be a Base Station (BS). The access network device 10 may wirelessly communicate with the terminal 20 via one or more antennas. The access network device 10 can provide communication coverage for its geographical area. The BS may include different types of macro BSs, micro BSs, relay stations, and access points. In some embodiments, the BS may be referred to by those skilled in the art as a BS transceiver, a wireless BS, an access point, a wireless transceiver, a Basic Service Set (BSS), an Extended Service Set (ESS), a Node B (NodeB), an evolved NodeB (eNB or eNodeB) or some other appropriate terms. For example, in a 5G system, the BS is called gNB. For convenience of description, in embodiments of the present disclosure, the above apparatuses for providing the wireless communication function for the terminal 20 are collectively referred to as the access network device.

The terminal 20 may be distributed throughout the whole mobile communication system, and each terminal 20 may be stationary or mobile. The terminal 20 may also be referred to by those skilled in the art as a mobile station, a subscriber station, a mobile unit, a subscriber unit, a wireless unit, a remote unit, a mobile device, a user device, a wireless device, a wireless communication device, a remote device, a mobile subscriber station, an access terminal, a mobile terminal, a wireless terminal, a remote terminal, a handheld device, a user agent, a mobile client, a client, or some other appropriate terms. The terminal 20 may be a cellular telephone, a Personal Digital Assistant (PDA), a wireless modem, a wireless communication device, a handheld device, a tablet computer, a laptop computer, a cordless telephone, or a Wireless Local Loop (WLL) station. The terminal 20 can communicate with the access network device 10 in the mobile communication system.

The access network device 10 and the terminal 20 can communicate with each other through New Radio (NR) technology, such as, cellular technology. The communication link between the access network device 10 and the terminal 20 may include: down link (DL) transmission from the access network device 10 to the terminal 20, and/or, up link (UP) transmission from the terminal 20 to the access network device 10. DL transmission may also be referred to as forward link transmission, and UP transmission may also be referred to as reverse link transmission. In some examples, DL transmission may include transmission of discovery signals, which may include reference signals and/or synchronization signals.

The mobile communication system in FIG. 1 may be a Long Term Evolution (LTE) system, or a next-generation evolution system based on the LTE system, such as an LTE-Advanced (LTE-A) system, a 5G system (also known as NR system), or a next-generation evolution system based on the 5G system. In embodiments of the disclosure, the terms "system" and "network" are often used interchangeably, but their meanings can be understood by those skilled in the art.

The communication systems and service scenarios described in embodiments of the disclosure are for the purpose of illustrating the technical solution of the embodiments of the disclosure more clearly, and do not constitute a limitation on the technical solution provided by the embodiments of the disclosure. Those of ordinary skill in the art know that with the evolution of communication systems and the emergence of new service scenarios, the technical solution provided by the embodiments of the disclosure are also applicable to similar technical problems.

In the communication system in FIG. 1, the terminal needs to use a synchronization signal and physical broadcast channel (PBCH) block (SSB) to complete initial access.

In the time domain, one SSB occupies 4 symbols (that is, Orthogonal Frequency Division Multiplexing (OFDM) symbols), including 1 symbol of Primary Synchronized Signal (PSS), 1 symbol of Secondary Synchronized Signal (SSS) and 2 symbols of PBCH. In the SSB, symbols are numbered from 0 to 3 in an ascending order. In the frequency domain, one SSB occupies 24 consecutive Resource Blocks (RBs). Each RB includes 12 subcarriers, and the subcarriers of the above 24 RBs are numbered from 0 to 287 in an ascending order, starting with RB numbered 0. For PSS and SSS, the resources are mapped to the middle 127th subcarrier. For PBCH, the resources are mapped to the 288th subcarrier. PSS. SSS, and PBCH have the same Cyclic Prefix (CP) length and subcarrier spacing. The subcarrier spacing can be configured to 15 kHz, 30 kHz, 120 kHz and 240 kHz.

In the initial access process, the terminal will detect the received SSB firstly, obtain the master information block (MIB) in the SSB, and obtain configuration of control resource set 0 (CORESET0) and search space (SS) of physical downlink control channel (PDCCH) of the terminal for monitoring and scheduling other system information (e.g., system information block 1, SIB1), from the MIB. The amount of information that can be carried in the MIB is small, and 4 bits are used to indicate different CORESET0 configurations and SS configurations respectively. According to the indication of the MIB, the terminal can determine the frequency offset of CORESET #0 relative to the SSB, and the size of the frequency resource occupied by CORESET0, that is, the number of RBs.

Figure 2:
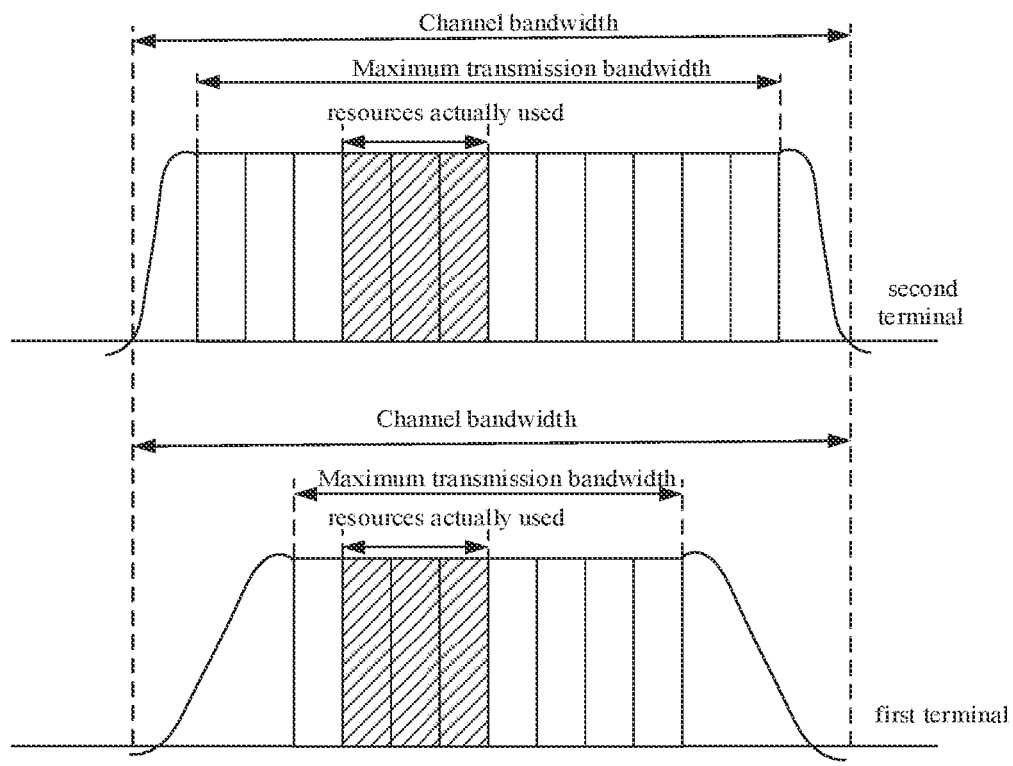
FIG. 2 is a schematic diagram of a relation between a maximum transmission bandwidth supported by a first terminal and a maximum transmission bandwidth supported by a second terminal according to an embodiment.

In order to meet the requirements of different communication services, there are two types of terminals in the communication system in FIG. 1, namely, a first terminal and a second terminal. The capabilities of the two terminals may be different. For example, the maximum transmission bandwidth supported by the second terminal is greater than the maximum transmission bandwidth supported by the first terminal. FIG. 2 is a schematic diagram of a relation between the maximum transmission bandwidth supported by the first terminal and the maximum transmission bandwidth supported by the second terminal according to an embodiment. As illustrated in FIG. 2, the channel bandwidth of the first terminal is identical to that of the second terminal. The maximum transmission bandwidth supported by the second terminal is greater than the maximum transmission bandwidth supported by the first terminal.

In embodiments of the disclosure, the first terminal may also be referred to as a reduced capability NR device, a reduced capability User Equipment (UE), or a capability restricted UE. For example, the first terminal may be some sensors in the industrial internet of things, wireless video monitoring devices in smart cities, and wearable devices such as wristbands and watches, and health and medical monitoring devices. The second device may also be referred to as a normal device.

In the related art, for the second terminal, the correspondence between the size of the frequency resource occupied by CORESET0 and the indicator bit is given by Table 13-1 to Table 13-10 in TS38.213. For example, the protocol stipulates that for a channel with a minimum channel bandwidth of 5 MHz or 10 MHz, when the SCS is 15 KHz, the configurable minimum frequency domain width of CORESET0 is 24 RBs. For the second terminal, under a given channel bandwidth and SCS, the maximum transmission bandwidth it supports is greater than the configurable minimum frequency domain width of CORESET0. If the maximum transmission bandwidth supported by the first terminal under a given channel bandwidth is less than that of the second terminal, for example, is 20 RBs, if CORESET0 is still configured according to the minimum frequency domain width of 24 RBs, the configured frequency domain width of CORESET0 will exceed the maximum transmission bandwidth of the first terminal, which affects the first terminal's reception of important system information, such as MIB and SIB1, thereby affecting access of the first terminal to the communication system.

Figure 3:
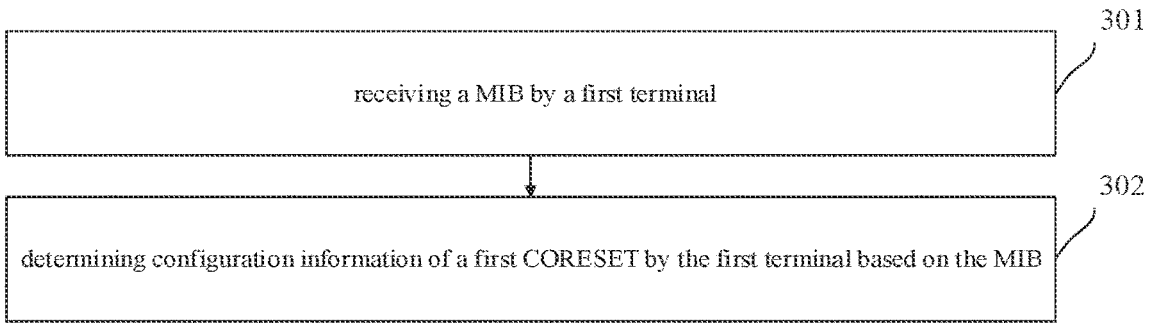
FIG. 3 is a flowchart of a method for determining configuration information according to an embodiment.

FIG. 3 is a flowchart of a method for determining configuration information according to an embodiment. The method can be performed by the first terminal in FIG. 1, as illustrated in FIG. 3, the method includes the following steps.

In step 301, an MIB is received by a first terminal.

In step 302, configuration information of a first CORESET is determined by the first terminal based on the MIB, in which the configuration information of the first CORESET includes a frequency domain width of the first CORESET, the frequency domain width of the first CORESET is less than a frequency domain width of a second CORESET of a second terminal, and the frequency domain width of the second CORESET is determined based on the MIB.

In a possible implementation, the MIB includes a first configuration field configured to indicate the configuration information of the first CORESET of the first terminal and a second configuration field configured to indicate configuration information of the second CORESET of the second terminal.

In the implementation, by adding the first configuration field in the MIB, the first terminal and the second terminal can obtain the configuration information of the corresponding CORESET respectively based on different fields in the MIB.

In another possible implementation, the MIB includes a configuration field indicating configuration information of CORESETs.

Determining the configuration information of the CORESET by the first terminal based on the MIB includes:
determining, by the first terminal, a CORESET corresponding to a value of the configuration field as the configuration information of the first CORESET based on a first mapping relationship, in which the first mapping relationship is a correspondence between values of the configuration field and the configuration information of the CORESET, and the configuration information of the CORESET corresponding to the value of the configuration field in the first mapping relationship is different from the configuration information of the CORESET corresponding to the same value of the configuration field in a second mapping relationship, and the second mapping relationship is configured to enable the second terminal to determine the configuration information of the second CORESET based on the second mapping relationship.

In the implementation, the first terminal and the second terminal may obtain the configuration information of different CORESETs by mapping the same configuration field in the MIB that is used to indicate the configuration information of the CORESET based on different mapping relationships. There is no need to add new fields in the MIB, to meet the extremely limited number of information bits that can be carried in the MIB.

In another possible implementation, the frequency domain width of the first CORESET is equal to a difference between the frequency domain width of the second CORESET of the second terminal and a width difference value, and the width difference value is an integer.

In the implementation, the first terminal can calculate the frequency domain width of the first CORESET according to the frequency domain width of the second CORESET and the width difference value.

In some examples, the MIB includes a configuration field indicating configuration information of CORESETs, different values of the configuration field correspond to the same width difference value, or, at least part of the different values of the configuration field correspond to different width difference values.

In some examples, the configuration information of the first CORESET includes at least one of following parameters: a multiplexing mode between SSB and CORESET, a number of symbols in the first CORESET, and a frequency offset between frequency resource of the first CORESET and the corresponding SSB.

In some examples, the method further includes: determining, by the first terminal, monitoring parameters of a PDCCH based on the MIB.

In some examples, the monitoring parameters of the PDCCH determined by the first terminal based on the MIB are different from or identical to monitoring parameters of the PDCCH determined by the second terminal based on the MIB.

In some examples, the monitoring parameters of the PDCCH include at least one of the following parameters: an initial symbol position, a timeslot position, and a number of search spaces in a timeslot.

In some examples, the maximum transmission bandwidth supported by the second terminal is greater than the maximum transmission bandwidth supported by the first terminal.

It should be noted that the foregoing steps 301-302 and the foregoing optional steps may be combined arbitrarily.

Figure 4:
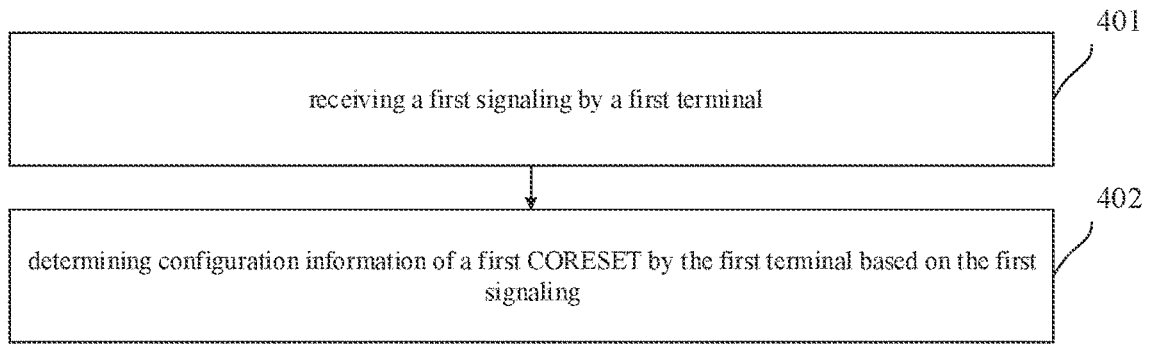
FIG. 4 is a flowchart of a method for determining configuration information according to an embodiment.

FIG. 4 is a flowchart of a method for determining configuration information according to an embodiment. The method can be performed by the first terminal in FIG. 1, as illustrated in FIG. 4, the method includes the following steps.

In step 401, the first terminal receives a first signaling, in which the first signaling includes a first configuration field indicating configuration information of a first CORESET of the first terminal and a second configuration field indicating configuration information of a second CORESET of a second terminal, the configuration information of the first CORESET includes a frequency domain width of the first CORESET, and the frequency domain width of the first CORESET is less than a frequency domain width of the second CORESET of the second terminal.

In step 402, the first terminal determines the configuration information of the first CORESET based on the first signaling.

For example, the first signaling may be sent by the access network device to the first terminal.

In some examples, the configuration information of the first CORESET includes at least one of the following parameters: a multiplexing mode between SSB and CORESET, a number of symbols in the first CORESET, and a frequency offset between frequency resource of the first CORESET and the corresponding SSB.

In some examples, the first signaling is further configured to indicate the monitoring parameters of the PDCCH.

In some examples, the monitoring parameters of the PDCCH determined by the first terminal based on the first signaling are different from or identical to monitoring parameters of the PDCCH determined by the second terminal based on the first signaling.

In some examples, the monitoring parameters of the PDCCH include at least one of the following parameters: an initial symbol position, a timeslot position, and a number of search spaces in a timeslot.

In some examples, the maximum transmission bandwidth supported by the second terminal is greater than the maximum transmission bandwidth supported by the first terminal.

It should be noted that the foregoing steps 401-402 and the foregoing optional steps may be combined arbitrarily.

In an embodiment of the disclosure, the MIB in the SSB indicates the second configuration field of the configuration information of the second CORESET of the second terminal, and any other feasible signaling may be configured to indicate the first configuration field of the configuration information of the first CORESET of the first terminal, which is not limited in embodiments of the disclosure.

Figure 5:
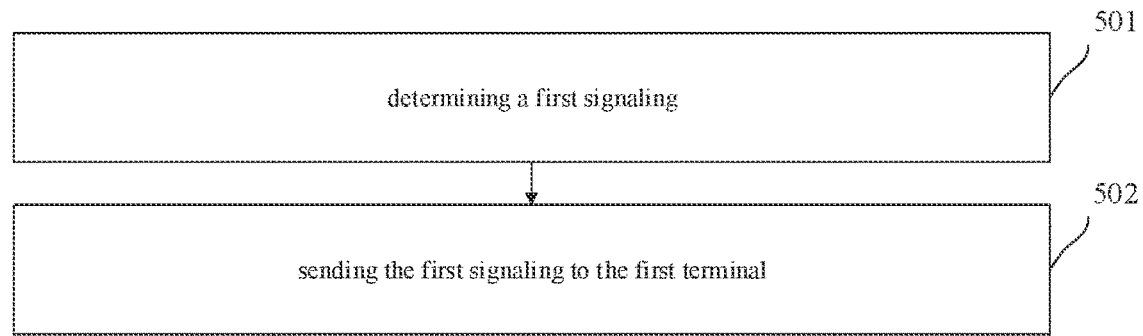
FIG. 5 is a flowchart of a method for determining configuration information according to an embodiment.

FIG. 5 is a flowchart of a method for determining configuration information according to an embodiment. The method can be performed by the access network device, as illustrated in FIG. 5, the method includes the following steps.

In step 501, a first signaling is determined, in which the first signaling includes at least a first configuration field indicating configuration information of a first CORESET to a first terminal and a second configuration field indicating configuration information of a second CORESET to a second terminal, and a frequency domain width of the first CORESET is less than a frequency domain width of the second CORESET of the second terminal.

In step 502, the first signaling is sent to the first terminal.

In some examples, the configuration information of the first CORESET includes at least one of the following parameters: a multiplexing mode between SSB and CORESET, a number of symbols in the first CORESET, and a frequency offset between frequency resource of the first CORESET and the corresponding SSB.

In some examples, the first signaling is further configured to indicate the monitoring parameters of the PDCCH.

In some examples, the monitoring parameters of the PDCCH determined by the first terminal based on the first signaling are different from or identical to monitoring parameters of the PDCCH determined by the second terminal based on the first signaling.

In some examples, the monitoring parameters of the PDCCH include at least one of the following parameters: an initial symbol position, a timeslot position, and a number of search spaces in a timeslot.

In some examples, the maximum transmission bandwidth supported by the second terminal is greater than the maximum transmission bandwidth supported by the first terminal.

For example, the first signaling is an MIB.

It should be noted that the foregoing steps 501-502 and the foregoing optional steps may be combined arbitrarily.

In all embodiments of the disclosure, the MIB in the SSB may indicate the second configuration field of the configuration information of the second CORESET of the second terminal, and any other feasible signaling may be used to indicate the first configuration field of the configuration information of the first CORESET of the first terminal, which is not limited in this embodiment of the disclosure.

Figure 6:
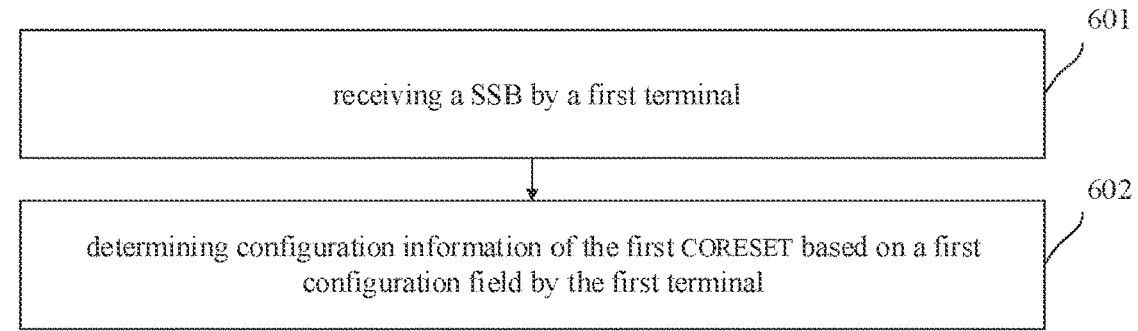
FIG. 6 is a flowchart of a method for determining configuration information according to an embodiment.

FIG. 6 is a flowchart of a method for determining configuration information according to an embodiment. The method can be performed by the first terminal, as illustrated in FIG. 6, the method includes the following steps.

In step 601, the first terminal receives a SSB including an MIB.

The MIB includes the first configuration field for indicating the configuration information of the first CORESET of the first terminal and the second configuration field for indicating the configuration information of the second CORESET of the second terminal.

For example, in the following MIB format, pdcch-ConfigSIB1-RestrictUE is the first configuration field, which is a newly added configuration field dedicated to configure CORESET0 of the first terminal, and pdcch-ConfigSIB1 is the second configuration field, which is the original configuration field in the MIB. Other fields are the original fields in the MIB.

```
MIB ::=   SEQUENCE {
    systemFrameNumber              BIT STRING (SIZE (6)),
    subCarrierSpacingCommon        ENUMERATED {scs15or60, scs30or120},
    ssb-SubcarrierOffset           INTEGER (0..15),
    dmrs-TypeA-Position            ENUMERATED {pos2, pos3},
    pdcch-ConfigSIB1               PDCCH-ConfigSIB1,
    pdcch-ConfigSIB1-RestrictUE    PDCCH-ConfigSiB1,
    cellBarred                     ENUMERATED {barred, notBarred},
    intraFreqReselection           ENUMERATED {allowed, notAllowed},
    spare                          BIT STRING (SIZE (1))
}
```

In step 602, the first terminal determines configuration information of the first CORESET based on the first configuration field.

In step 602, the first terminal can determine the configuration information of the first CORESET based on the MIB, in which the configuration information of the first CORESET includes a frequency domain width of the first CORESET. The frequency domain width of the first CORESET is less than a frequency domain width of a second CORESET of a second terminal. The frequency domain width of the second CORESET is determined based on the MIB, and the first terminal and the second terminal are terminals in the same communication system (eg, the communication system in FIG. 1).

For example, for the same channel bandwidth, the maximum transmission bandwidth supported by the second terminal is greater than the maximum transmission bandwidth supported by the first terminal.

In some examples, the configuration information of the first CORESET includes at least one of the following parameters: a multiplexing mode between SSB and CORESET, a number of symbols in the first CORESET, and a frequency offset between frequency resource of the first CORESET and the corresponding SSB.

In some examples, step 602 includes:
determining, by the first terminal, the configuration information of the first CORESET based on a correspondence between a value of the first configuration field and the CORESET. The correspondence may be specified by a protocol.

In some examples, the frequency domain width of the first CORESET is equal to a difference between the frequency domain width of the second CORESET of the second terminal and a width difference value, and the width difference value is an integer.

In some examples, the method may further include: determining, by the first terminal, monitoring parameters of the PDCCH based on the MIB.

In some examples, the monitoring parameters of the PDCCH determined by the first terminal based on the MIB are different from or identical to monitoring parameters of the PDCCH determined by the second terminal based on the MIB.

In some examples, the monitoring parameters of the PDCCH include at least one of the following parameters: an initial symbol position, a timeslot position, and a number of search spaces in a timeslot.

In this embodiment of the disclosure, the frequency domain width of the first CORESET determined by the first terminal based on the MIB is less than the frequency domain width of the second CORESET determined by the second terminal based on the MIB, so that the first terminal can complete the detection and reception of system information related to the first CORESET in a smaller frequency domain width, which reduces the capability requirement for the first terminal and facilitates the first terminal to access the communication system.

Moreover, when the maximum transmission bandwidth supported by the first terminal is less than the maximum transmission bandwidth supported by the second terminal, the frequency domain width of the first CORESET determined by the first terminal based on the MIB is less than the frequency domain width of the second CORESET determined by the second terminal based on the MIB, which can ensure that the first terminal can normally receive the system information related to the first CORESET.

In addition, the first configuration field for indicating the configuration information of the first CORESET of the first terminal is added to the MIB, so that the MIB includes the first configuration field configured to indicate the configuration information of the first CORESET of the first terminal and the second configuration field configured to indicate configuration information of the second CORESET of the second terminal. Therefore, the first terminal and the second terminal can obtain the configuration information of the corresponding CORESET based on different fields in the MIB respectively, and the implementation manner is simple.

Figure 7:
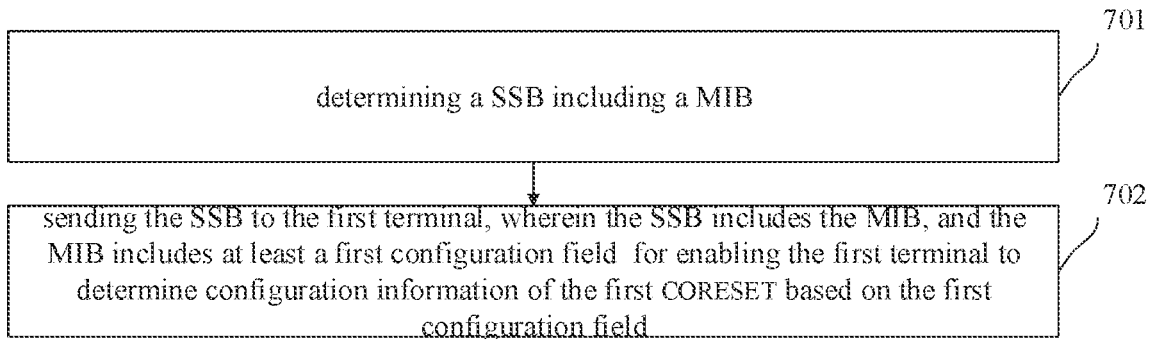
FIG. 7 is a flowchart of a method for determining configuration information according to an embodiment.

FIG. 7 is a flowchart of a method for determining configuration information according to an embodiment. The method can be performed by the access network device, as illustrated in FIG. 7, the method includes the following steps.

In step 701, a SSB including an MIB is determined.

The MIB includes a first configuration field configured to indicate the configuration information of the first CORESET of the first terminal and a second configuration field configured to indicate configuration information of the second CORESET of the second terminal.

For example, in the following MIB format, pdcch-ConfigSIB1-RestrictUE is the first configuration field, which is a newly added configuration field dedicated to configure CORESET0 of the first terminal, and pdcch-ConfigSIB1 is the second configuration field, which is the original configuration field in the MIB. Other fields are the original fields in the MIB.

```
MIB ::= SEQUENCE {
    systemFrameNumber              BIT STRING (SIZE (6)),
    subCarrierSpacingCommon        ENUMERATED {scs15or60, scs30or120},
    ssb-SubcarrierOffset           INTEGER (0..15),
    dmrs-TypeA-Position            ENUMERATED {pos2, pos3},
    pdcch-ConfigSIB1               PDCCH-ConfigSIB1,
    pdcch-ConfigSIB1-RestrictUE    PDCCH-ConfigSIB1,
    cellBarred                     ENUMERATED {barred, notBarred},
    intraFreqReselection           ENUMERATED {allowed, notAllowed},
    spare                          BIT STRING (SIZE (1))
}
```

In step 702, the SSB is sent to the first terminal, in which the SSB includes the MIB, and the MIB includes at least the first configuration field for enabling the first terminal to determine the configuration information of the first CORESET based on the first configuration field.

With the above embodiment, the MIB used by the first terminal to determine the configuration information of the first CORESET can be generated, and sent to the first terminal through the SSB. The configuration information of the first CORESET includes the frequency domain width of the first CORESET. The frequency domain width of the first CORESET is less than the frequency domain width of the second CORESET of the second terminal. The second CORESET is determined based on the MIB, which means that the first terminal and the second terminal are terminals in the same communication system (e.g., the communication system in FIG. 1). For the same channel bandwidth, the maximum transmission bandwidth supported by the second terminal is greater than the maximum transmission bandwidth supported by the first terminal.

In some examples, the configuration information of the first CORESET includes at least one of the following parameters: a multiplexing mode between SSB and CORESET, a number of symbols in the first CORESET, and a frequency offset between frequency resource of the first CORESET and the corresponding SSB.

In some examples, step 702 includes:
sending the SSB to the first terminal, in which the SSB includes the MIB, and the MIB includes at least first configuration field for enabling the first terminal to determine configuration information of the first CORESET based on the first configuration field, so that the first terminal determines the configuration information of the first CORESET based on the correspondence between the value of the first configuration field and the CORESET. The correspondence may be specified by a protocol.

In some examples, the frequency domain width of the first CORESET is equal to a difference between the frequency domain width of the second CORESET of the second terminal and a width difference value, and the width difference value is an integer.

In some examples, the MIB is further configured to indicate the monitoring parameters of the PDCCH.

In some examples, the monitoring parameters of the PDCCH determined by the first terminal based on the MIB are different from or identical to monitoring parameters of the PDCCH determined by the second terminal based on the MIB.

In some examples, the monitoring parameters of the PDCCH include at least one of the following parameters: an initial symbol position, a timeslot position, and a number of search spaces in a timeslot.

In this embodiment of the disclosure, when the maximum transmission bandwidth supported by the first terminal is less than the maximum transmission bandwidth supported by the second terminal, the frequency domain width of the first CORESET determined by the first terminal based on the MIB is less than the frequency domain width of the second CORESET determined by the second terminal based on the MIB, which ensures that the first terminal can normally receive the system information related to the first CORESET.

In addition, the first configuration field for indicating the configuration information of the first CORESET of the first terminal is added to the MIB, so that the MIB includes the first configuration field configured to indicate the configuration information of the first CORESET of the first terminal and the second configuration field configured to indicate configuration information of the second CORESET of the second terminal. Therefore, the first terminal and the second terminal can obtain the configuration information of the corresponding CORESET based on different fields in the MIB respectively, and the implementation manner is simple.

In all the embodiments of the disclosure, the MIB in the SSB may indicate the second configuration field of the configuration information of the second CORESET of the second terminal, and any other feasible signaling can be used to indicate the first configuration field of the configuration information of the first CORESET of the first terminal, which is not limited in the embodiments of the disclosure.

Figure 8:
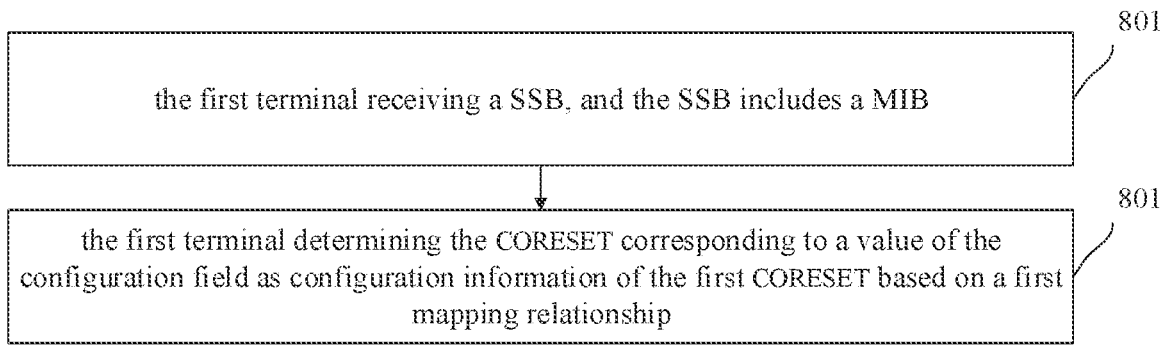
FIG. 8 is a flowchart of a method for determining configuration information according to an embodiment.

FIG. 8 is a flowchart of a method for determining configuration information according to an embodiment. The method can be executed by the first terminal, as illustrated in FIG. 8, the method includes the following steps.

In step 801, the first terminal receives a SSB including an MIB.

The MIB includes a configuration field for indicating configuration information of CORESETs. For example, the format of the MIB may be the format after the first configuration field is removed in the example in step 601.

In step 802, the first terminal determines the CORESET corresponding to a value of the configuration field as the configuration information of the first CORESET based on a first mapping relationship, in which the first mapping relationship is a correspondence between the value of the configuration field and the configuration information of the CORESET, and the configuration information of the CORESET corresponding to the value of the configuration field in the first mapping relationship is different from the configuration information of the CORESET corresponding to the same value of the configuration field in a second mapping relationship, and the second mapping relationship is configured to enable the second terminal to determine the configuration information of the second CORESET based on the second mapping relationship.

Here, the second CORESET is determined based on the MIB, which means that the first terminal and the second terminal are terminals in the same communication system (for example, the communication system in FIG. 1).

For example, for the same channel bandwidth, the maximum transmission bandwidth supported by the second terminal is greater than the maximum transmission bandwidth supported by the first terminal.

In this step 802, the first terminal can determine the configuration information of the first CORESET based on the MIB.

In some examples, the configuration information of the first CORESET includes at least one of the following parameters: a multiplexing mode between SSB and CORESET, a number of symbols in the first CORESET, and a frequency offset between frequency resource of the first CORESET and the corresponding SSB.

In the existing NR protocol, the second terminal obtains controlResourceSetZer information (that is, a value of 4 bits in the configuration field used to indicate the configuration of CORESET0) by receiving the MIB, and maps it through Table 13-1 to 13-10 in TS38.213, to obtain information such as a multiplexing mode between SSB and CORESET, the frequency domain width of CORESET0, the number of time domain symbols of CORESET0, and a frequency offset between the frequency resource of CORESET0 and the corresponding SSB corresponding to different controlResourceSetZer values. That is, the second mapping relationship includes Tables 13-1 to 13-10.

In this embodiment of the disclosure, a table different from Tables 13-1 to 13-10 in TS38.213 may be configured for the first terminal as the second mapping relationship, so that for the same value (index) of the configuration field, the frequency domain width of CORESET0 corresponding to the first terminal is less than the frequency domain width of CORESET0 corresponding to the second terminal. Here, the frequency domain width is the number of RBs.

In this embodiment of the disclosure, for the same controlResourceSetZero value, part of or all of other parameters in the configuration information of the first CORESET (that is, the multiplexing mode between SSB and CORESET, the number of symbols in the first CORESET, the frequency offset between the frequency resource of the first CORESET and the corresponding SSB) can be set to be different from the corresponding parameters in the configuration information of the second CORESET, that is, have different values, so as to meet the requirements of the first terminal. For example, in the case of multiplexing mode 1 between SSB and CORESET0, the frequency resource of CORESET0 should include the frequency resource occupied by SSB, and the frequency offset between CORESET0 and SSB can be appropriately adjusted to adapt to the change of bandwidth.

For example, corresponding to Table 13-1, a newly added Table 13-1a defines the new CORESET0 configuration information of the first terminal under the same value.

TABLE 13-1

Set of resource blocks and slot symbols of CORESET for Type0-PDCCH search space set when {SS/PBCH block, PDCCH} SCS is {15, 15} kHz for frequency bands with minimum channel bandwidth 5 MHz or 10 MHz

| Index | multiplexing mode between SSB and CORESET | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 0 |
| 2 | 1 | 24 | 2 | 4 |
| ... | | | | |

TABLE 13-1a

Set of resource blocks and slot symbols of CORESET for Type0-PDCCH search space set when {SS/PBCH block, PDCCH} SCS is {15, 15} kHz for frequency bands with minimum channel bandwidth 5 MHz or 10 MHz, for capacity restricted UEs only

| Index | multiplexing mode between SSB and CORESET | Number of RBs $N_{RB}^{CORESET}$ | Number of Symbols $N_{symb}^{CORESET}$ | Offset (RBs) |
|---|---|---|---|---|
| 0 | 1 | 20 | 2 | 0 |
| 1 | 1 | 20 | 2 | 0 |
| 2 | 1 | 20 | 2 | 0 |
| ... | | | | |

In Table 13-1, the configuration information of the second CORESET corresponding to a value of 0 is: the multiplexing mode between SSB and CORESET is 1, the frequency domain width of CORESET0 is 24 RBs, the number of symbols is 2, and the frequency offset between the frequency resource of the first CORESET and the corresponding SSB is 0. In Table 13-1a, the configuration information of the first CORESET corresponding to a value of 0 is: the multiplexing mode between SSB and CORESET is 1, the frequency domain width of CORESET0 is 20 RBs, the number of symbols is 2, and the frequency offset between the frequency resource of the first CORESET and the corresponding SSB is 0. It can be seen that when the value is 0, the frequency domain width of the first CORESET is less than the frequency domain width of the second CORESET, and the values of other parameters in the configuration information of the first CORESET are the same as the values of other parameters in the configuration information of the second CORESET.

In Table 13-1, the configuration information of the second CORESET corresponding to a value of 1 is: the multiplexing mode between SSB and CORESET is 1, the frequency domain width of CORESET0 is 24 RBs, the number of symbols is 2, and the frequency offset between the frequency resource of the first CORESET and the corresponding SSB is 2. In Table 13-1a, the configuration information of the first CORESET corresponding to a value of 1 is: the multiplexing mode between SSB and CORESET is 1, the frequency domain width of CORESET0 is 20 RBs, the number of symbols is 2, and the frequency offset between the frequency resource of the first CORESET and the corresponding SSB is 0. It can be seen that when the value is 0, the frequency domain width of the first CORESET is less than the frequency domain width of the second CORESET. Among other parameters in the configuration information of the first CORESET, the frequency offset between the frequency resource of the first CORESET and the corresponding SSB is different from the frequency offset between the frequency resource of the second CORESET and the corresponding SSB, the multiplexing mode between SSB and CORESET and the number of symbols are the same, that is, among other parameters in the configuration information of the first CORESET, some parameter values are different from the corresponding parameter values in the configuration information of the second CORESET.

It should be noted that the above only takes some of the entries in Table 13-1 as examples to illustrate the difference between the first mapping relationship and the second mapping relationship, which is not limited in the embodiment of the disclosure. The parameter values corresponding to each value of the configuration field can be set according to actual needs.

In embodiments of the disclosure, the frequency domain width of the first CORESET determined by the first terminal based on the MIB is less than the frequency domain width of the second CORESET of the second terminal determined based on the MIB, so that the first terminal can complete the detection and reception of system information related to the first CORESET in a smaller frequency domain width, which reduces the capability requirement for the first terminal and facilitates the first terminal to access the communication system.

Moreover, when the maximum transmission bandwidth supported by the first terminal is less than the maximum transmission bandwidth supported by the second terminal, the frequency domain width of the first CORESET determined by the first terminal based on the MIB is less than the frequency domain width of the second CORESET determined by the second terminal based on the MIB, which can ensure that the first terminal can normally receive the system information related to the first CORESET.

In addition, since the number of information bits that can be carried in the MIB is extremely limited, adding the field in the MIB will have a great impact on the standard, and will also affect the reception of system information by the NR UE in the past. In this embodiment, for the same value of the configuration field in the MIB, the first terminal and the second terminal obtain configuration information of different CORESETs based on different mapping relationships, without changing the original fields in the MIB, thereby avoiding the need for corresponding adverse effects.

Figure 9:
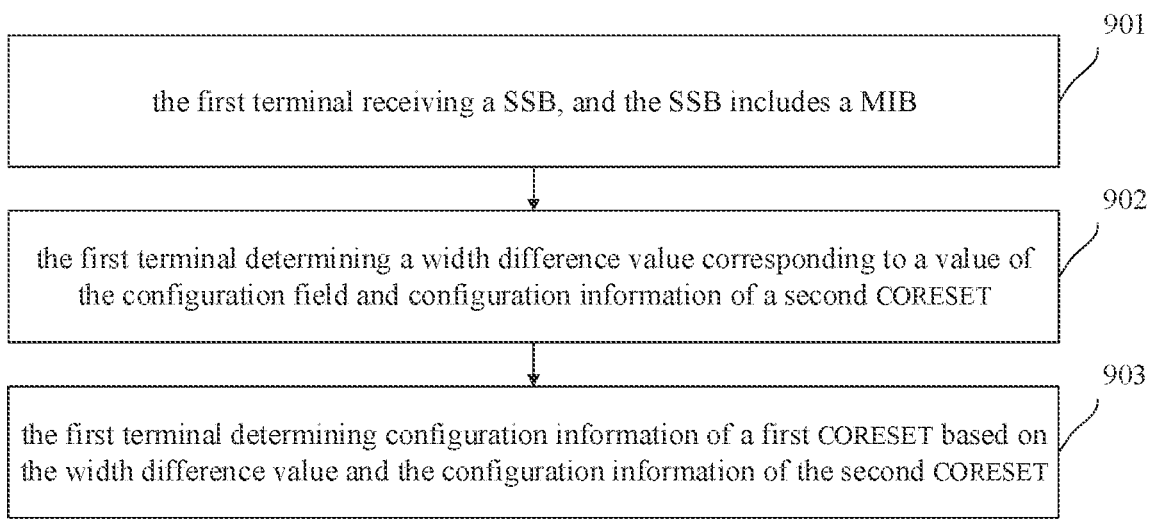
FIG. 9 is a flowchart of a method for determining configuration information according to an embodiment.

FIG. 9 is a flowchart of a method for determining configuration information according to an embodiment. The method can be performed by the first terminal, as illustrated in FIG. 9, the method includes the following steps.

In step 901, the first terminal receives a SSB including an MIB.

The MIB includes a configuration field for indicating configuration information of CORESETs. For example, the format of the MIB may be the format after the first configuration field is removed in the example in step 601.

In step 902, the first terminal determines the width difference value corresponding to the value of the configuration field and the configuration information of the second CORESET.

In the embodiment of the disclosure, the width difference value is an integer, for example, 4. It should be noted that the specific width difference value can be set according to actual needs, which is not limited in the disclosure.

The configuration information of the second CORESET includes the frequency domain width of the second CORESET.

In step 903, the first terminal determines the configuration information of the first CORESET based on the width difference value and the configuration information of the second CORESET.

The configuration information of the first CORESET includes the frequency domain width of the first CORESET.

In some examples, the configuration information of the first CORESET includes at least one of the following parameters: a multiplexing mode between SSB and CORESET, a number of symbols in the first CORESET, and a frequency offset between frequency resource of the first CORESET and the corresponding SSB.

For example, in step 903, the difference between the frequency domain width of the second CORESET of the second terminal and the width difference value may be used as the frequency domain width of the first CORESET, so that the frequency domain width of the first CORESET is less than the frequency domain width of the second CORESET of the second terminal. Moreover, other parameters in the configuration information of the second CORESET except the frequency domain width of the second CORESET are set as other parameters in the configuration information of the first CORESET except the frequency domain width of the first CORESET.

In this embodiment of the disclosure, for the same channel bandwidth, the maximum transmission bandwidth supported by the second terminal is greater than the maximum transmission bandwidth supported by the first terminal.

With steps 902 to 903, the first terminal can determine the configuration information of the first CORESET based on the MIB.

In a possible implementation, the width difference values corresponding to different values of the configuration field are the same, that is, the width difference value is a fixed value.

In another possible implementation, width difference values corresponding to at least part of different values of the configuration field are different. In this implementation, the correspondence between values of the configuration field and the width difference values can be represented by a list. For example, the following table shows the correspondence between the values of the configuration field and the frequency domain widths. When the values are 0 and 1, the corresponding frequency domain width is the same, which is 4. When the value is 2, the corresponding frequency domain width is 2, which is different from the corresponding frequency domain width when the values are 0 and 1. It should be noted that, the number of values in the correspondence between values of the configuration field and the frequency domain widths is only an example, which is not limited in the embodiment of the disclosure.

Correspondence table between values of the configuration field and frequency domain widths

| values | frequency domain widths (RBs) |
|---|---|
| 0 | 4 |
| 1 | 4 |
| 2 | 2 |
| ... | ... |

In this embodiment of the disclosure, the frequency domain width of the first CORESET determined by the first terminal based on the MIB is less than the frequency domain width of the second CORESET determined by the second terminal based on the MIB, so that the first terminal can complete the detection and reception of system information related to the first CORESET in a smaller frequency domain width, which reduces the capability requirement for the first terminal and facilitates the first terminal to access the communication system.

Moreover, when the maximum transmission bandwidth supported by the first terminal is less than the maximum transmission bandwidth supported by the second terminal, the frequency domain width of the first CORESET determined by the first terminal based on the MIB is less than the frequency domain width of the second CORESET determined by the second terminal based on the MIB, which can ensure that the first terminal can normally receive the system information related to the first CORESET.

In addition, since the number of information bits that can be carried in the MIB is extremely limited, adding the field in the MIB will have a great impact on the standard, and will also affect the reception of system information by the NR UE in the past. In this embodiment, the first terminal may determine the width difference value and the frequency domain width of the second CORESET based on the configuration field in the MIB, and determine the frequency domain width of the first CORESET according to the width difference value and the frequency domain width of the second CORESET, without changing the original fields in the MIB, thereby avoiding the corresponding adverse effects. In all the embodiments of the disclosure, the MIB in the SSB may indicate the second configuration field of the configuration information of the second CORESET of the second terminal, and any other feasible signaling may be used to indicate the first configuration field of the configuration information of the first CORESET of the first terminal, which is not limited in this embodiment of the disclosure.

For example, in the method in FIG. 8 and/or FIG. 9, the method may further include: determining the monitoring parameters of the PDCCH based on the MIB.

In some examples, the monitoring parameters of the PDCCH include at least one of the following parameters: an initial symbol position, a timeslot position, and a number of search spaces in a timeslot.

The protocol stipulates that the second terminal obtains searchSpaceZero information by receiving the MIB, and obtains the monitoring parameters of the PDCCH of the terminal on CORESET0 corresponding to different searchSpaceZero values through Table13-11 to Table13-15, such as the initial symbol position, the timeslot position, and the number of search spaces in a timeslot.

In a possible implementation, the monitoring parameters of the PDCCH corresponding to values of the configuration field are defined for the first terminal, which are different from those of the second terminal. For example, corresponding tables may be added to Table 13-11 to Table 13-15, which are used for the first terminal to determine corresponding monitoring parameters of the PDCCH according to different searchSpaceZero values. In this case, the monitoring parameters of the PDCCH determined by the first terminal based on the MIB are different from or identical to the monitoring parameters of the PDCCH determined by the second terminal based on the MIB.

In another possible implementation, the first terminal also determines the monitoring parameters of the PDCCH corresponding to the values of the configuration field in the MIB based on Table 13-11 to Table 13-15. In this case, the monitoring parameters of the PDCCH determined by the first terminal based on the MIB is identical to the monitoring parameters of the PDCCH determined by the second terminal based on the MIB.

Figure 10:
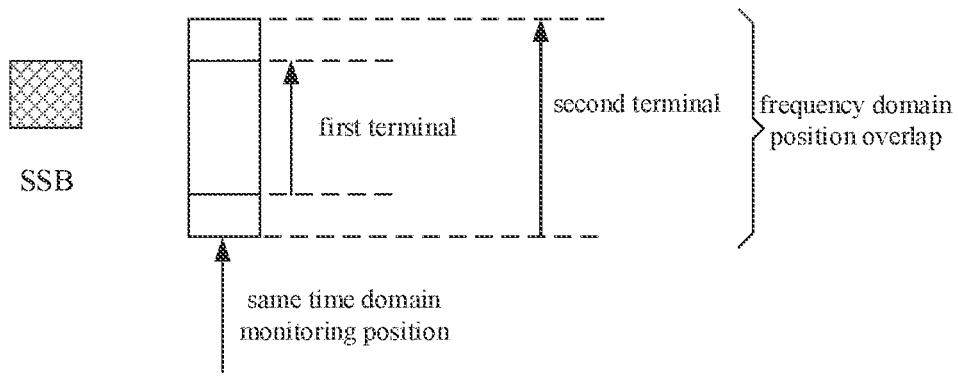
FIGS. 10 to 12 respectively show a relation between a time-frequency resource of CORESET0 of the first terminal and a time-frequency resource of CORESET0 of the second terminal.
Figure 11:
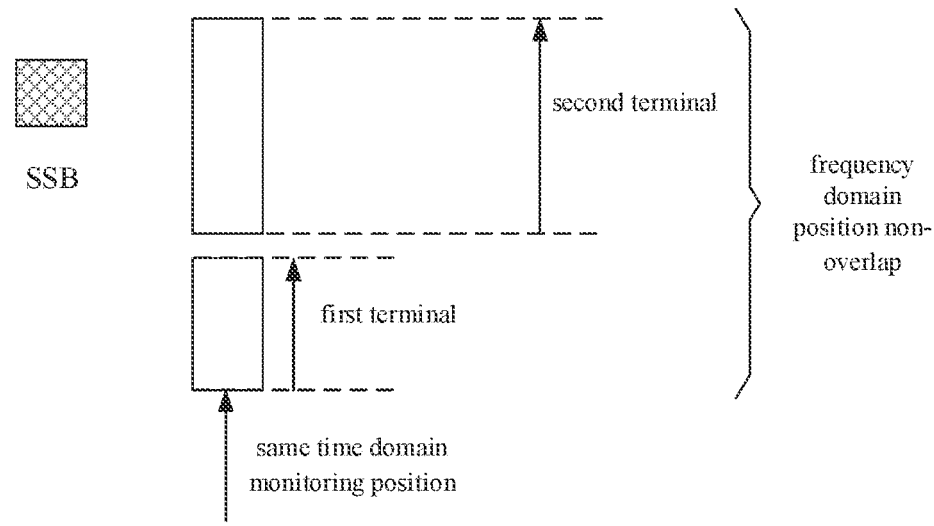
Figure 12:
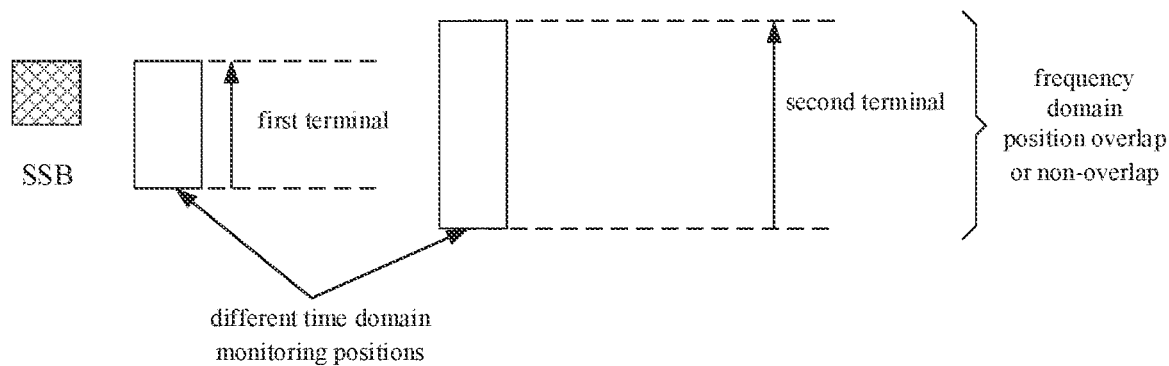

FIGS. 10 to 12 show the relation between the time frequency resource of CORESET0 of the first terminal and the time frequency resource of CORESET0 of the second terminal.

As illustrated in FIG. 10, the first terminal and the second terminal monitor the PDCCH on the same time unit and time domain symbol, and the frequency domain resource of CORESET0 of the second terminal include the frequency domain resource of CORESET0 of the first terminal. That is, the time-frequency resource of the CORESET0 of the second terminal includes the time-frequency resource of the CORESET0 of the first terminal, and the same PDCCH and corresponding PDSCH can be used to transmit the same system information to the two terminals through the scheduling of the access network device.

As illustrated in FIG. 11, the first terminal and the second terminal monitor the PDCCH on the same time unit and time domain symbol, but the frequency domain resource of CORESET0 of the second terminal does not overlap with the frequency domain resource of CORESET0 of the first terminal, that is, the time frequency resource of CORESET0 of the second terminal does not overlap with the time frequency resource of CORESET0 of the first terminal, and the access network device needs to send the PDCCH and the corresponding PDSCH respectively to transmit system information to the two terminals. Although the system overhead is increased, different system information can be defined for the first terminal than for the second terminal.

As illustrated in FIG. 12, the monitoring parameters of the PDCCH of the first terminal are different from the monitoring parameters of the PDCCH of the second terminal, so that the first terminal and the second terminal detect and receive PDCCH in different time units and time domain symbols. In this case, the time-frequency resource of CORESET0 of the second terminal does not overlap with the time-frequency resource of CORESET0 of the first terminal, and the access network device needs to send the PDCCH and the corresponding PDSCH respectively to transmit system information to the two terminals. Although the system overhead is increased, different system information can be defined for the first terminal than for the second terminal.

The following are apparatus embodiments of the disclosure. For details that are not described in detail in the apparatus embodiments, reference may be made to the foregoing method embodiments.

Figure 13:
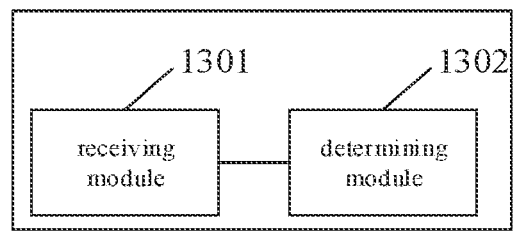
FIG. 13 is a schematic diagram of an apparatus for determining configuration information according to an embodiment.

FIG. 13 is a schematic diagram of an apparatus for determining configuration information according to an embodiment. The apparatus has the function of implementing the above method example, and the function may be implemented by hardware or by executing corresponding software by the hardware. As illustrated in FIG. 13, the apparatus for determining configuration information includes: a receiving module 1301 and a determining module 1302.

The receiving module 1301 is configured to receive a MIB.

The determining module 1302 is configured to determine configuration information of a first CORESET based on the MIB, wherein the configuration information of the first CORESET includes a frequency domain width of the first CORESET, the frequency domain width of the first CORESET is less than a frequency domain width of a second CORESET of a second terminal, and the frequency domain width of the second CORESET is determined based on the MIB.

In a possible implementation, the MIB includes a first configuration field configured to indicate the configuration information of the first CORESET of the first terminal and a second configuration field configured to indicate configuration information of the second CORESET of the second terminal.

In another possible implementation, the MIB includes a configuration field indicating configuration information of CORESETs.

The determining module 1302 is configured to determine a CORESET corresponding to a value of the configuration field as the configuration information of the first CORESET based on a first mapping relationship, in which the first mapping relationship is a correspondence between the value of the configuration field and the configuration information of CORESET, and the configuration information of the CORESET corresponding to the value of the configuration field in the first mapping relationship is different from the configuration information of the CORESET corresponding to the same value of the configuration field in a second mapping relationship, and the second mapping relationship is configured to enable the second terminal to determine the configuration information of the second CORESET based on the second mapping relationship.

In some examples, the frequency domain width of the first CORESET is equal to a difference between the frequency domain width of the second CORESET of the second terminal and a width difference value, and the width difference value is an integer.

In some examples, the MIB includes a configuration field indicating configuration information of CORESETs. Different values of the configuration field correspond to the same width difference value, or, different values of the configuration field correspond to different width difference values.

In some examples, the configuration information of the first CORESET includes at least one of the following parameters: a multiplexing mode between SSB and CORESET, a number of symbols in the first CORESET, and a frequency offset between frequency resource of the first CORESET and the corresponding SSB.

In some examples, the determining module 1302 is further configured to determine monitoring parameters of a PDCCH based on the MIB.

In some examples, the monitoring parameters of the PDCCH determined by the determining module 1302 based on the MIB are different from or identical to monitoring parameters of the PDCCH determined by the second terminal based on the MIB.

In some examples, the monitoring parameters of the PDCCH include at least one of the following parameters: an initial symbol position, a timeslot position, and a number of search spaces in a timeslot.

In some examples, the maximum transmission bandwidth supported by the second terminal is greater than the maximum transmission bandwidth supported by the first terminal.

Figure 14:
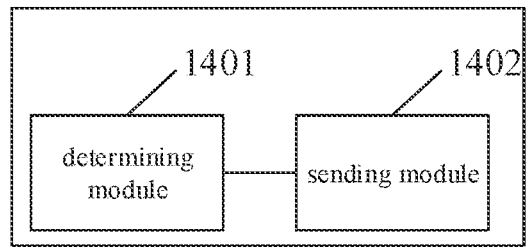
FIG. 14 is a schematic diagram of an apparatus for determining configuration information according to an embodiment.

FIG. 14 is a schematic diagram of an apparatus for determining configuration information according to an embodiment. The apparatus has the function of implementing the above method example, and the function may be implemented by hardware or by executing corresponding software by the hardware. As illustrated in FIG. 14, the apparatus for determining configuration information includes: a determining module 1401 and a sending module 1402.

The determining module 1401 is configured to determine a first signaling, in which the first signaling includes at least a first configuration field indicating configuration information of a first CORESET of a first terminal and a second configuration field indicating configuration information of a second CORESET of a second terminal, and a frequency domain width of the first CORESET is less than a frequency domain width of the second CORESET of the second terminal.

The sending module 1402 is configured to send the first signaling to the first terminal.

In some examples, the configuration information of the first CORESET includes at least one of the following parameters: a multiplexing mode between SSB and CORESET, a number of symbols in the first CORESET, and a frequency offset between frequency resource of the first CORESET and the corresponding SSB.

In some examples, the first signaling is further configured to indicate monitoring parameters of the PDCCH.

In some examples, the monitoring parameters of the PDCCH determined by the first terminal based on an MIB are different from or identical to the monitoring parameters of the PDCCH determined by the second terminal based on the MIB.

In some examples, the monitoring parameters of the PDCCH include at least one of the following parameters: an initial symbol position, a timeslot position, and a number of search spaces in a timeslot.

For example, the maximum transmission bandwidth supported by the second terminal is greater than the maximum transmission bandwidth supported by the first terminal.

For example, the first signaling is the MIB.

Figure 15:
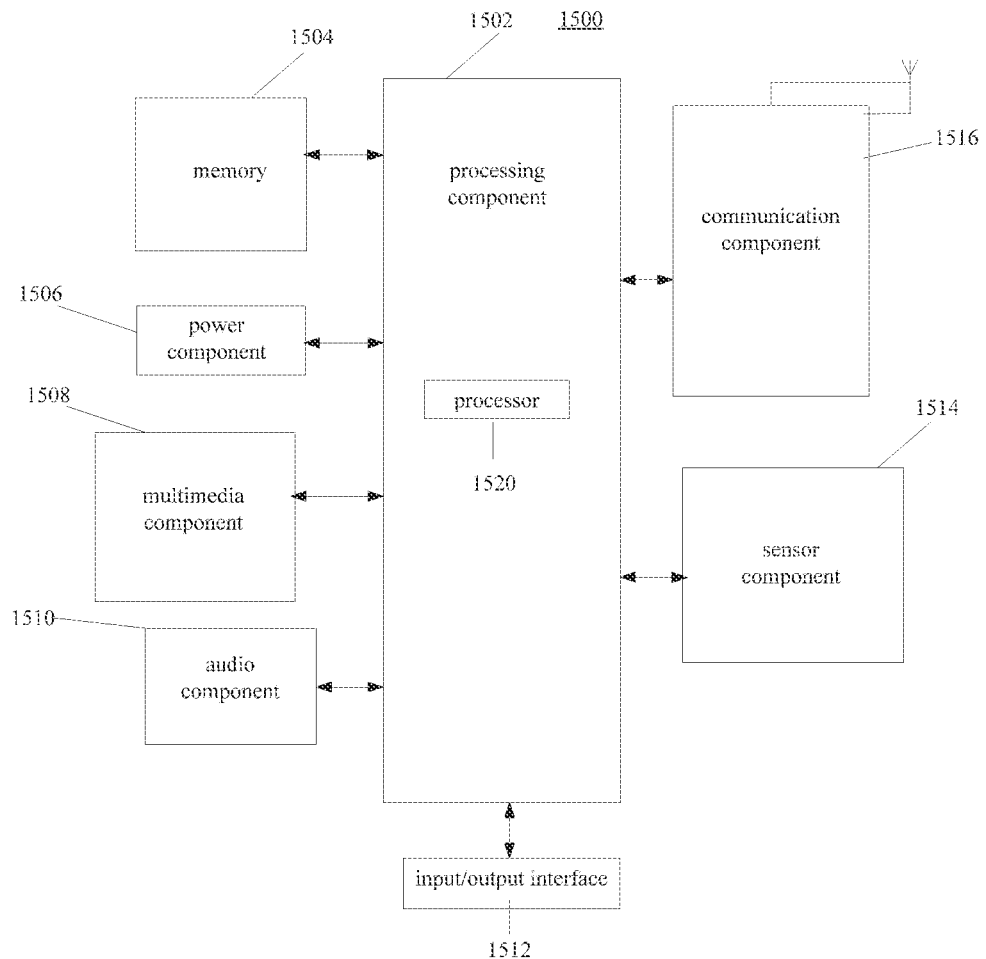
FIG. 15 is a block diagram of an apparatus for determining configuration information according to an embodiment.

FIG. 15 is a block diagram of an apparatus for determining configuration information 1500 according to an embodiment. The apparatus 1500 may be the above terminal. As illustrated in FIG. 15, the apparatus for determining configuration information 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 typically controls overall operations of the apparatus 1500, such as the operations associated with display, telephone calls, data communications, camera operations, and recording operations. The processing component 1502 may include one or more processors 1120 to execute instructions to perform all or part of the steps in the above described method. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the apparatus 1500. Examples of such data include instructions for any applications or methods operated on the apparatus 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the apparatus 1500. The power component 1506 may include a power management system, one or more power sources, and any other components associated with the generation, management, and distribution of power in the apparatus 1500.

The multimedia component 1508 includes a screen providing an output interface between the apparatus 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front-facing camera and/or a rear-facing camera. When the apparatus 1500 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 1510 is configured to output and/or input audio signals. For example, the audio component 1510 includes a microphone (MIC) configured to receive an external audio signal when the apparatus 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide status assessments of various aspects of the apparatus 1500. For instance, the sensor component 1514 may detect an open/closed status of the apparatus 1500, relative positioning of components, e.g., the display and the keypad, of the apparatus 1500, a change in position of the apparatus 1500 or a component of the apparatus 1500, a presence or absence of user contact with the apparatus 1500, an orientation or an acceleration/deceleration of the apparatus 1500, and a change in temperature of the apparatus 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, or a temperature sensor.

The communication component 1516 is configured to facilitate wireless communication between the apparatus 1500 and other devices. In the embodiment of the disclosure, the communication component 1516 can access a wireless network based on a communication standard, such as WiFi, 2G, or 3G, or a combination thereof. In an embodiment, the communication component 1516 receives a broadcast signal or broadcast associated information from an external broadcast management system via a broadcast channel. In some examples, the communication component 1516 further includes an NFC module.

In embodiments, the apparatus 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as included in the memory 1504, executable by the processor 1520 in the apparatus 1500, for performing the above method. For example, non-transitory computer-readable storage medium may be a ROM, a RAM, a CD-ROM, a magnetic tape, a floppy disc, an optical data storage device, and the like.

Figure 16:
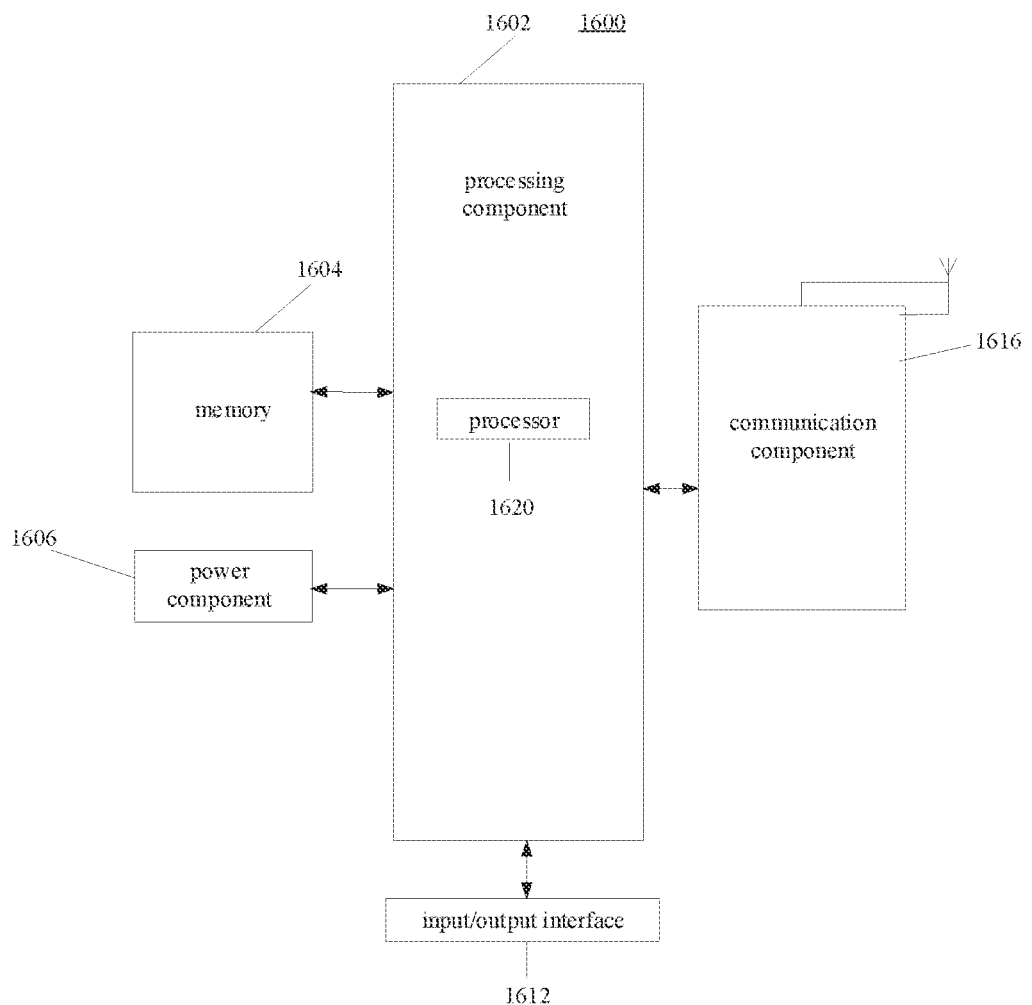
FIG. 16 is a block diagram of an apparatus for determining configuration information according to an embodiment.

FIG. 16 is a block diagram of an apparatus for determining configuration information 1600 according to an embodiment. The apparatus 1600 may be the above access network device. As illustrated in FIG. 16, the apparatus for determining configuration information 1600 may include one or more of the following components: a processing component 1602, a memory 1604, a power component 1606, an input/output (I/O) interface 1612, and a communication component 1616.

The processing component 1602 typically controls overall operations of the apparatus 1600, such as the operations associated with display, telephone calls, data communications, camera operations, and recording operations. The processing component 1602 may include one or more processors 1620 to execute instructions to perform all or part of the steps in the above described method. Moreover, the processing component 1602 may include one or more modules which facilitate the interaction between the processing component 1602 and other components. For instance, the processing component 1602 may include a multimedia module to facilitate the interaction between the multimedia component 1608 and the processing component 1602.

The memory 1604 is configured to store various types of data to support the operation of the apparatus 1600. Examples of such data include instructions for any applications or methods operated on the apparatus 1600, contact data, phonebook data, messages, pictures, video, etc. The memory 1604 may be implemented using any type of volatile or non-volatile memory devices, or a combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 1606 provides power to various components of the apparatus 1600. The power component 1606 may include a power management system, one or more power sources, and any other components associated with the generation, management, and distribution of power in the apparatus 1600.

The I/O interface 1612 provides an interface between the processing component 1602 and peripheral interface modules, such as a keyboard, a click wheel, buttons, and the like. The buttons may include, but are not limited to, a home button, a volume button, a starting button, and a locking button.

The communication component 1616 is configured to facilitate wireless communication between the apparatus 1600 and other devices. In the embodiment of the disclosure, the communication component 1616 can provide a wireless network based on a communication standard, such as WiFi, 2G, 3G, 4G, or 5G, or a combination thereof, to access the terminal device.

In embodiments, the apparatus 1600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as a memory 1604 including instructions that can be executed by the processor 1620 of the apparatus for determining configuration information 1600 to perform the above method. For example, non-transitory computer-readable storage medium may be a ROM, a RAM, a CD-ROM, a magnetic tape, a floppy disc, an optical data storage device, and the like.

In all the embodiments of the disclosure, the MIB in the SSB may indicate the second configuration field of the configuration information of the second CORESET of the second terminal, and any other feasible signaling can be used to indicate the first configuration field of the configuration information of the first CORESET of the first terminal, which is not limited in the embodiments of the disclosure.

An embodiment of the disclosure also provides a communication system. The communication system includes an access network device and a terminal. The terminal includes the apparatus for determining configuration information provided in the embodiment in FIG. 13 or FIG. 15.

The technical solution of the embodiments of the disclosure may include the following beneficial effects.

In embodiments of the disclosure, the frequency domain width of the first CORESET determined by the first terminal based on the MIB is less than the frequency domain width of the second CORESET determined by the second terminal based on the MIB, so that the first terminal can complete detection and reception of system information related to the first CORESET in a smaller frequency domain width, which reduces the capability requirement for the first terminal and facilitates the first terminal to access the communication system.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only.

It will be appreciated that the disclosure is not limited to the exact construction that has been described above and illustrated in the accompanying drawings, and that various modifications and changes can be made without departing from the scope thereof.

What is claimed is:

1. A method for determining configuration information, comprising:
   receiving, by a first terminal, a master information block (MIB); and
   determining, by the first terminal, configuration information of a first control resource set based on the MIB, wherein the configuration information of the first control resource set comprises a frequency domain width of the first control resource set, the frequency domain width of the first control resource set is less than a frequency domain width of a second control resource set of a second terminal, and the frequency domain width of the second control resource set is determined based on the MIB;
   wherein the MIB comprises a configuration field indicating configuration information of control resource sets, and determining by the first terminal the configuration information of the first control resource set based on the MIB comprises:
      determining, by the first terminal, a control resource set corresponding to a value of the configuration field as the configuration information of the first control resource set based on a first mapping relationship, wherein the first mapping relationship is a correspondence between values of the configuration field and the configuration information of the control resource sets, and the configuration information of the control resource set corresponding to the value of the configuration field in the first mapping relationship is different from the configuration information of the control resource set corresponding to the same value of the configuration field in a second mapping relationship, and the second mapping relationship is configured to enable the second terminal to determine the configuration information of the second control resource set based on the second mapping relationship.

2. The method of claim 1, wherein the configuration information of the first control resource set comprises at least one of: a multiplexing mode between synchronization signal blocks and control resource sets, a number of symbols in the first control resource set, and a frequency offset between frequency resource of the first control resource set and a corresponding synchronization signal block.

3. The method of claim 1, further comprising:
   determining, by the first terminal, monitoring parameters of a physical downlink control channel (PDCCH) based on the MIB.

4. The method of claim 3, wherein the monitoring parameters of the PDCCH determined by the first terminal based on the MIB are different from or identical to monitoring parameters of the PDCCH determined by the second terminal based on the MIB.

5. The method of claim 3, wherein the monitoring parameters of the PDCCH comprise at least one of: an initial symbol position, a timeslot position, and a number of search spaces in a timeslot.

6. The method of claim 1, wherein a maximum transmission bandwidth supported by the second terminal is greater than a maximum transmission bandwidth supported by the first terminal.

7. A method for determining configuration information, comprising:
   determining, by an access network device, a first signaling, wherein the first signaling comprises a configuration field indicating configuration information of control resource sets, wherein the configuration field is used for a first terminal to determine a control resource set corresponding to a value of the configuration field as configuration information of a first control resource set based on a first mapping relationship, wherein the first mapping relationship is a correspondence between values of the configuration field and the configuration information of the control resource sets, and the configuration information of the control resource set corresponding to the value of the configuration field in the first mapping relationship is different from configuration information of a control resource set corresponding to the same value of the configuration field in a second mapping relationship, and the second mapping relationship is configured to enable a second terminal to determine configuration information of a second control resource set based on the second mapping relationship; and a frequency domain width of the first control resource set is less than a frequency domain width of the second control resource set of the second terminal; and
   sending, by the access network device, the first signaling to the first terminal.

8. The method of claim 7, wherein the configuration information of the first control resource set comprises at least one of: a multiplexing mode between synchronization signal blocks and control resource sets, a number of symbols in the first control resource set, and a frequency offset between frequency resource of the first control resource set and a corresponding synchronization signal block.

9. The method of claim 7, wherein the first signaling is further configured to indicate monitoring parameters of a physical downlink control channel (PDCCH).

10. The method of claim 9, wherein the monitoring parameters of the PDCCH determined by the first terminal based on the first signaling are different from or identical to monitoring parameters of the PDCCH determined by the second terminal based on the first signaling.

11. The method of claim 10, wherein the monitoring parameters of the PDCCH comprise at least one of: an initial symbol position, a timeslot position, and a number of search spaces in a timeslot.

12. The method of claim 7, wherein a maximum transmission bandwidth supported by the second terminal is greater than a maximum transmission bandwidth supported by the first terminal.

13. The method of claim 7, wherein the first signaling is a master information block (MIB).

14. A first terminal, comprising:
   a processor; and
   a memory configured to store instructions executable by the processor;
   wherein the processor is configured to:
      receive a master information block (MIB); and determine configuration information of a first control resource set based on the MIB, wherein the configuration information of the first control resource set comprises a frequency domain width of the first control resource set, the frequency domain width of the first control resource set is less than a frequency domain width of a second control resource set of a second terminal, and the frequency domain width of the second control resource set is determined based on the MIB;

wherein the MIB comprises a configuration field indicating configuration information of control resource sets, and in determining configuration information of the first control resource set based on the MIB, the processor is further configured to:

determine a control resource set corresponding to a value of the configuration field as the configuration information of the first control resource set based on a first mapping relationship, wherein the first mapping relationship is a correspondence between values of the configuration field and the configuration information of the control resource sets, and the configuration information of the control resource set corresponding to the value of the configuration field in the first mapping relationship is different from the configuration information of the control resource set corresponding to the same value of the configuration field in a second mapping relationship, and the second mapping relationship is configured to enable the second terminal to determine the configuration information of the second control resource set based on the second mapping relationship.

15. An access network device, comprising:

a processor; and a memory configured to store instructions executable by the processor;

wherein the processor is configured to perform the method of claim 7.

* * * * *